United States Patent [19]

Tanaka

[11] Patent Number: 5,045,587

[45] Date of Patent: Sep. 3, 1991

[54] METHOD OF MAINTAINING FLOWABILITY OF ACRYLIC POLYMER DISPERSION

[75] Inventor: Katsutoshi Tanaka, Chigasaki, Japan

[73] Assignee: Kyoritsu Yuki Co., Ltd., Tokyo, Japan

[21] Appl. No.: 449,023

[22] Filed: Dec. 12, 1989

[30] Foreign Application Priority Data

Dec. 12, 1988 [JP] Japan ................... 63-312003

[51] Int. Cl.$^5$ ............. C08K 5/01; C08K 5/06; C08K 5/10; C08K 2/16

[52] U.S. Cl. ............. 524/310; 524/308; 524/311; 524/317; 524/378; 524/475; 524/555; 524/556; 524/565; 526/234; 528/494; 528/498

[58] Field of Search ............. 524/310, 317, 378, 475, 524/476, 832, 556, 565, 555, 308; 526/234, 237; 528/494, 487, 488

[56] References Cited

U.S. PATENT DOCUMENTS 4,696,962 9/1987 Danner et al. ................ 524/475 X

FOREIGN PATENT DOCUMENTS 46-14907 4/1971 Japan .
52-39417 10/1977 Japan .
123610 6/1986 Japan .
62-15251 1/1987 Japan .
62-20502 1/1987 Japan .

Primary Examiner—Fred Teskin
Attorney, Agent, or Firm—Browdy and Neimark

[57] ABSTRACT

The present invention relates to a method of maintaining the flowability of a dispersion of fine particles of a water-soluble polymer mainly comprising acrylic acid and/or acrylamide in an aqueous salt solution for a long period of time.

In order to attain the above-described object, the present invention is characterized by adding to a polymer dispersion 0.05 to 1% by weight, based on the dispersion, of a nonionic surfactant and 2 to 10% by weight, based on the dispersion, of an oleaginous liquid. The aqueous salt solution for dispersing the polymer particles is most preferably an aqueous solution of a salt wherein the counter ion is a monovalent cation, and the salt concentration of the aqueous solution is preferably at least 15% by weight.

The acrylic water-soluble polymer dispersion is used for applications such as high-molecular flocculants, sizing agents, or paper-strength agents.

6 Claims, No Drawings

METHOD OF MAINTAINING FLOWABILITY OF ACRYLIC POLYMER DISPERSION

BACKGROUND OF THE INVENTION

1. Field of the Invention

The present invention relates to a method or maintaining the flowability of an acrylic polymer dispersion by which the flowability of a polymer dispersion comprising an acrylic water-soluble polymer used for applications, such as highmolecular flocculants, sizing agents, or paperstrength agents, can be maintained for a long period of time.

2. Description of the Prior Art

A water-soluble acrylic polymer has been commercially available in the form of an aqueous solution or a dry powder. However, both of them were poor in the workability and the handleability because the acrylic polymer is viscous in the form of an aqueous solution and is not fluid in the form of powder. In order to solve these problems, a proposal has been made on a method wherein fine particles of a water-soluble acrylic polymer are dispersed in an oil or an aqueous salt solution to prepare a low-viscosity liquid. For example, Japanese Patent Publication No. 39417/1977 discloses a water-in-oil type emulsion comprising 75 to 85% by weight, based on the emulsion, of an aqueous phase composed of 20 to 50% by weight, based on the emulsion, of a water-soluble addition polymer and 35 to 55% by weight, based on the emulsion, of water, 5 to 24.9% by weight, based on the emulsion, of a hydrophobic liquid, and 0.1 to 15% by weight, based on the emulsion, of a water-in-oil type emulsifier. Japanese Patent Publication No. 14907/1971 discloses polymerization of acrylic acid alone or together with a copolymerizable monomer in a solution having a pH value of 1 to 4 in the presence of an inorganic salt in an amount sufficient for precipitating a polymer with agitation at a speed sufficient for suspending the precipitated polymer. Further, Japanese Patent Laid-Open No. 123610/1986 of which the applicant is the same as the one pertaining to the present invention discloses polymerization of a cationic monomer represented by the following formula (1) alone or together with a copolymerizable monomer in an aqueous salt solution in the presence of a polymer soluble in the aqueous salt solution:

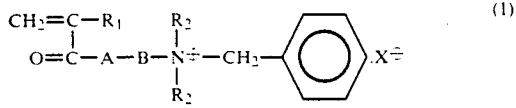

(1)

wherein $R_1$ is H or $CH_3$, $R_2$ and $R_3$ are each an alkyl group having 1 to 3 carbon atoms, A is an oxygen atom or NH, B is an alkyl group having 2 to 4 carbon atoms or a hydroxypropylene group, and $X^-$ is a counter anion.

Japanese Patent Laid-Open No. 15251/1987 of which the applicant is the same as the one pertaining to the present invention discloses dispersion of a polymer of a cationic monomer represented by the above-described formula (1) alone or together with a copolymerizable monomer in an aqueous salt solution which does not dissolve said polymer, wherein another polymer soluble in the aqueous salt solution is added as a dispersant. Further, Japanese Patent Laid-Open No. 20502/2987 discloses polymerization of an acrylic water-soluble monomer in an aqueous salt solution with agitation while precipitating the formed polymer in the presence of a polyhydric alcohol.

However, in order to prepare a water-in-oil type emulsion as disclosed in the above-described Japanese Patent Publication No. 39417/1977, it is necessary to use a high-purity organic solvent as a dispersion medium. Use of such a solvent brings about an increase in the cost. The dispersion of a polymer in an aqueous salt solution disclosed in the above-described Publication No. 4907/1971 brings about agglomeration of particles and unfavorably loses its flowability in a week (usually in several hours) when allowed to stand even under favorable conditions. The methods disclosed in the above-described Japanese Patent Laid-Open Nos. 123610/1986. 15251/1987, and 20502/1987 are mainly applied to cationic polymers but cannot be applied to nonionic and anionic acrylic polymers without difficulty.

SUMMARY OF THE INVENTION

An object of the present invention is to solve the above-described problems to thereby provide a method of maintaining the flowability of an acrylic polymer dispersion by which fine particles of an acrylic polymer mainly comprising acrylic acid and/or acrylamide can be kept stable in an aqueous salt solution for a long period of time.

Another object of the present invention is to provide a simple and economical method of preparing a readily handleable dispersion of an acrylic watersoluble polymer suitable for use in applications such as high-molecular flocculants, sizing agents, and papaer-strength agents.

In order to attain the above-described objects, the present invention has the following constitution. Specifically, the present invention relates to a method of maintaining the flowability of an acrylic polymer dispersion which comprises polymerizing a monomer composition composed of 0 to 100% by weight of acrylic acid, 0 to 90% by weight of acrylamide, 0 to 20% by weight of acrylonitrile, and 0 to 15% by weight of other monomer in an aqueous salt solution with agitation to prepare a dispersion wherein said polymer is precipitated as fine particles in said aqueous salt solution, and adding 0.05 to 1% by weight of a nonionic surfactant and 2 to 10% by weight of an oleaginous liquid, both based on the dispersion, to the formed dispersion.

DESCRIPTION OF THE PREFERRED EMBODIMENTS

The term "acrylic polymer" used in the present invention is intended to mean acrylic acid homopolymer, acrylic acid-acrylamide copolymer, acrylamide-acrylonitrile copolymer, acrylic acid-acrylamide-acrylonitrile terpolymer, etc. However, other monomers may be copolymerized in such an amount as will not provide any adverse effect on the polymerization and solubility in water, and it is possible to use, e.g., acrylic acid-acrylamide-acrylonitrile-diacetoneacrylamide copolymer. The monomer composition may comprise 0 to 100% by weight of acrylic acid, 0 to 90% by weight of acrylamide, 0 to 20% by weight of acrylonitrile, and 0 to 15% by weight of other monomer, and these proportions may be freely varied in so far as the formed polymer can be precipitated in fine particle form in an aqueous salt solution. Acrylic acid in the form of a dissociated ion increases the solubility of the polymer in water and hinders the precipitation of the polymer in the aqueous salt solution, which makes it necessary for a major portion of acrylic acid to be present in a non-dissociated state. However, it is also possible to ionize part of acrylic acid as far as the polymer can be precipitated.

The polymer dispersion used in the present invention may be prepared according to the technical concept disclosed in the above-described Japanese Patent Publication No. 14907/1971. The inorganic salt used in the method of maintaining the flowability of an acrylic polymer dispersion is one composed of a monovalent cation, such as ammonium salt or alkali metal salt and most preferably a sulfate, such as sodium sulfate or ammonium sulfate, because it can be advantageously used by virtue of high capability of precipitating the polymer. A chloride is the next most preferable salt. These salts are used in the form of an aqueous solution of a concentration of 15% or more.

The oleaginous liquid used in the method of maintaining the flowability of an acrylic polymer dispersion according to the present invention may be any of animal oils, vegetable oils, and mineral oils. For example, various hydrophobic organic liquids such as fatty acid esters, liquid hydrocarbons, substituted liquid hydrocarbons, and ethers may be used. However, when cost is taken into consideration, petroleums such as kerosine, middle oil, and liquid paraffin are inexpensive and practically advantageous. When the amount of addition of the oleaginous liquid is small, no sufficient effect can be attained, while when the amount is large, the cost is high. For this reason, the oleaginous liquid is used in an amount of 2 to 10% by weight, preferably 3 to 6% by weight based on the dispersion.

The surfactant used in the method of maintaining the flowability of an acrylic polymer dispersion according to the present invention is a nonionic surfactant soluble in the above-described oleaginous liquid. Although the hydrophilelypophile balance, i.e., HLB, is particularly preferably 8 to 12, it is a matter of course that a plurality of nonionic surfactants each having an HLB of 20 or less may be mixed together in such a manner that the HLB value of the mixture falls within the above-described HLB value range.

The nonionic surfactant is dissolved in an amount of 0.05 to 1% by weight, preferably 0.1 to 0.3% by weight based on the dispersion in the above-described oleaginous liquid and mixed with the dispersion.

Although the oleaginous liquid containing a nonionic surfactant dissolved therein may be effective even when added in the course of the polymerization, addition after substantial completion of the polymerization reaction is preferable from the viewpoint of avoiding any adverse effect on the polymerization reaction and preparing a high-molecular polymer.

FUNCTION

In the method of maintaining the flowability of an acrylic polymer dispersion according to the present invention, the oleaginous liquid and nonionic surfactant serve to prevent adhesion of fine particles of acrylic polymer to each other through coating of the surface of the fine particles therewith. The nonionic surfactant serves to guide the oleaginous liquid toward the surface of the particle. Therefore, both the oleaginous liquid and the nonionic surfactant may be added after the completion of the polymerization, and it is unnecessary to add them during precipitation of the polymer.

EXAMPLE

The method of maintaining the flowability of an acrylic polymer dispersion according to the present invention will now be described in more detail with reference to the following Examples. However, it is a matter of course that the present invention is not limited to these only as far as change and modification thereof are within the scope of the appended claims.

EXAMPLE 1

A 500-ml five-necked separable flask equipped with an agitator, a thermometer, a reflux condenser, and a nitrogen inlet tube was charged with 58 g of sodium sulfate, 42.16 g of acrylamide, 18.6 g of acrylic acid, and 280 g of deionized water. The mixture was heated to 35° C. and purged with nitrogen.

Polymerization was initiated by adding a polymerization initiator comprising 0.31 ml of a 1% aqueous ammonium persulfate solution, 0.31 ml of a 1% aqueous sodium hydrogensulfite solution, and 0.62 ml of a 1% aqueous 2,2'-azobis(2-amidinopropane) hydrochloride solution. After the initiation of the polymerization, 1.24 g of acrylonitrile was added, and the polymerization was continued at 35° C. for 24 hr with agitation, thereby preparing a particulate polymer dispersed in the aqueous salt soltuion. A solution preliminarily prepared by homogeneously mixing 20 g of kerosine with 0.8 g of polyoxyethylene sorbitan monooleate (HLB: 10.0) was added to the resultant dispersion and agitated to prepare a flowable polymer dispersion wherein the surfaces of the particles were coated with an oleaginous phase.

This product has a viscosity of 3500 cP at 25° C., and the viscosity of a 0.5% aqueous polymer solution after neutralization was 256 cP in 1N common salt solution. Even when the polymer dispersion was allowed to stand for one month, there occurred neither lowering in the flowability nor phase separation.

COMPARATIVE EXAMPLE 1

A polymer dispersion was prepared by conducting the same polymerization reaction as that of Example 1 and allowed to stand without adding the kerosine and the surfactant. After 2 hr, it was observed that the polymer dispersion lost its flowability.

Similarly, the loss of flowability was observed also in the case of a polymer dispersion prepared by adding kerosine or a surfactant alone.

EXAMPLE 2

The same separable flask as that used in Example 1 was charged with 68 g of sodium sulfate, 1 g of acrylamide, and 272 g of deionized water. The mixture was heated to 35° C. and purged with nitrogen. After 45 min, 9 g of acrylonitrile was added, and subsequently 0.3 ml of a 1% aqueous ammonium persulfate solution, 0.3 ml of a 1% aqueous sodium hydrogensulfite solution, and 0.6 ml of a 1% aqueous 2,2'-azobis(2-amidinopropane) hydrochloride solution were added as polymerization initiators. The polymerization was continued at 35° C. for 24 hr with agitation, thereby preparing a particulate polymer dispersed in the aqueous salt solution. A solution preliminarily prepared by homogeneously mixing 24 g of isoparaffin (under trade name of Isopar M; a product of Esso Chemicals) with 1.2 g of polyoxyethylene sorbitan trioleate (HLB: 11.0) was added to the resultant dispersion and agitated to prepare a flowable polymer dispersion wherein the surfaces of the particles were coated with an oleaginous phase.

This product had a viscosity of 4300 cP at 25° C., and the viscosity of a 0.5% polymer solution in 1N common salt solution was 120 cP. Even when the polymer dispersion was allowed to stand for one month, there occurred neither lowering in the flowability nor phase separation.

COMPARATIVE EXAMPLE 2

Polymerization reaction was conducted in the same manner as that of Example 2. 24 g of isoparaffin and 1.2 g of sodium alkylbenzenesulfonate were added to the reaction mixture, and the mixture was agitated to prepare a dispersion. After 2 hr, it was observed that the dispersion lost its flowability.

EXAMPLE 3

The same separable flask as that used in Example 1 was charged with 64 g of sodium sulfate, 51 g of acrylamide, 3 g of acrylic acid, 3 g of acrylonitrile, and 3 g of 2-acrylamido-2-methylpropanesulfonic acid. The mixture was heated to 35° C. and purged with nitrogen.

0.3 ml of a 1% aqueous ammonium persulfate solution, 0.3 ml of a 1% aqueous sodium hydrogensulfite solution, and 0.6 ml of a 1% aqueous 2,2'-azobis(2-amidinopropane) hydrochloride solution were added as polymerization initiators. The polymerization was continued at 35° C. for 24 hr with agitation, thereby preparing a particulate polymer dispersed in the aqueous salt solution. A solution preliminarily prepared by homogeneously mixing 20 g of kerosine with 1 g of polyoxyethylene oleyl ether (HLB: 10.0) was added to the resultant dispersion and agitated to prepare a flowable polymer dispersion wherein the surfaces of the particles were coated with an oleaginous phase. This product had a viscosity of 4200 cP, and the viscosity of a 0.5% aqueous polymer solution after neutralization was 175 cP in 1N common salt solution. Even when the polymer dispersion was allowed to stand for one month, there occurred neither lowering in the flowability nor phase separation.

COMPARATIVE EXAMPLE 3

Polymerization reaction was conducted in the same manner as that of example 3 to prepare a polymer dispersion. When none of the above-described kerosine and surfactant were added, the polymer dispersion lost its flowability 2 hr after being left to stand.

EXAMPLE 4

The same separable flask as that used in Example 1 was charged with 64 g of sodium chloride, 48 g of acrylic acid, and 286 g of deionized water and then charged with 2 g of a dispersant composed of a 65% aqueous solution of polyacrylic acid having a molecular weight of 2,000. The mixture was heated to 35° C. and purged with nitrogen.

0.24 ml of a 1% aqueous ammonium persulfate solution, 0.24 ml of a 1% aqueous sodium hydrogensulfite solution, and 0.48 ml of a 1% aqueous 2,2'-azobis(2-amidinopropane) hydrochloride solution were added as polymerization initiators. The polymerization was continued at 35° C. for 24 hr with agitation, thereby preparing a particulate polymer dispersed in the aqueous salt solution. A solution preliminarily prepared by homogeneously mixing 20 g of kerosine with 1 g of polyoxyethylene sorbitan monooleate (HLB: 10.0) was added to the resultant dispersion and agitated to prepare a flowable polymer dispersion wherein the surfaces of the particles were coated with an oleaginous phase.

This product had a viscosity of 2800 cP at 25° C., and the viscosity of a 0.5% aqueous polymer solution after neutralization was 105 cP in 1N common salt solution. Even when the polymer dispersion was allowed to stand for one month, there occurred neither lowering in the flowability nor phase separation.

COMPARATIVE EXAMPLE 4

Polymerization reaction was conducted in the same manner as that of Example 4 to prepare a polymer dispersion. When none of the above-described kerosine and surfactant were added, the polymer dispersion lost its flowability 2 hr after being left to stand.

EXAMPLE 5

The same separable flask as that used in Example 1 was charged with 55 g of sodium sulfate, 71.4 g of acrylamide, 4.2 g acrylic acid, and 261 g of deionized water. The mixture was heated to 32° C. and purged with nitrogen.

After 45 min, 8.4 g of acrylonitrile was added, and subsequently 0.25 ml of a 1% aqueous ammonium persulfate solution, 0.25 ml of a 1% aqueous sodium hydrogensulfite solution, and 0.42 ml of a 1% aqueous 2,2'-azobis(2-amidinopropane) hydrochloride solution were added as polymerization initiators. The polymerization was continued at 32° C. for 24 hr with agitation, thereby preparing a particulate polymer dispersed in the aqueous salt solution. A solution preliminarily prepared by homogeneously mixing 16 g of kerosine with 0.2 g of Hypermer B-246 (a polymeric surfactant having an HLB value of 5 to 6; a product of ICI) and 0.6 g of polyoxyethylene sorbitan trioleate (HLB: 11.0) was added to the resultant dispersion and agitated to prepare a flowable polymer dispersion wherein the surfaces of the particles were coated with an oleaginous phase.

This product had a viscosity of 4800 cP at 25° C., and the viscosity of a 0.5% aqueous polymer solution after neutralization was 175 cP in 1N common salt solution. Even when the polymer dispersion was allowed to stand for one month, there occurred neither lowering in the flowability nor phase separation.

COMPARATIVE EXAMPLE 5

Polymerization reaction was conducted in the same manner as that of Example 5 to prepare a polymer dispersion, which was allowed to stand without adding the kerosine and the surfactant. After 30 min, it was observed that the polymer dispersion lost its flowability.

What is claimed is:

1. A method of maintaining the flowability of an acrylic polymer dispersion comprising:
    1) polymerizing a monomer composition composed of:
        a. 85 to 100% by weight of at least one monomer selected from acrylic acid, acrylamide and acrylonitrile, wherein the proportion of the acrylic acid is from 0 to 100% by weight, that of acrylamide i from 0 to 90% by weight, and that of acrylonitrile is from 0 to 20% by weight, and
        b. 0 to 15% by weight of other monomer in an aqueous inorganic salt solution with agitation to prepare a dispersion wherein the formed polymer is precipitated as fine particles, and 2) adding to said dispersion 0.05 to 1% by weight of a nonionic surfactant and 2 to 10% by weight of an oleaginous liquid based upon the dispersion to maintain flowability of said dispersion.

2. A method of maintaining the flowability of an acrylic polymer dispersion according to claim 1, wherein said aqueous inorganic salt solution contains 15% by weight or more of of a salt selected from sodium chloride, ammonium sulfate, sodium sulfate, and mixtures thereof.

3. A method of maintaining the flowability of an acrylic polymer dispersion according to claim 1, wherein said nonionic surfactant has an HLB value of 8 to 12.

4. A method of maintaing the flowability of an acrylic polymer dispersion according to claim 1, wherein said nonionic surfactant is selected from polyoxyethylene sorbitan monooleate, polyoxyethylene sorbitan trioleate, polyoxyethylene oleyl ether, and mixtures thereof.

5. A method of maintaining the flowability of an acrylic polymer dispersion according to claim 1, wherein said oleaginous liquid is selected from kerosine, middle oil, liquid paraffin, and mixtures thereof.

6. A method of maintaining the flowability of an acrylic polymer dispersion according to claim 1, wherein said nonionic surfactant and said oleaginous liquid are added after completion of polymerization.

* * * * *